(12) United States Patent
Kobayashi et al.

(10) Patent No.: US 7,084,591 B2
(45) Date of Patent: Aug. 1, 2006

(54) ELECTRIC DRIVE CONTROL DEVICE, ELECTRIC DRIVE CONTROL METHOD, AND PROGRAM OF SAME

(75) Inventors: Yasuhiko Kobayashi, Anjo (JP); Masami Ishikawa, Tokyo-to (JP)

(73) Assignees: Aisin AW Co., Ltd, Anjo (JP); Kabushiki Kaisha Equos Research, Tokyo (JP)

( * ) Notice: Subject to any disclaimer, the term of this patent is extended or adjusted under 35 U.S.C. 154(b) by 0 days.

(21) Appl. No.: 11/109,618

(22) Filed: Apr. 20, 2005

(65) Prior Publication Data

US 2005/0253540 A1     Nov. 17, 2005

(30) Foreign Application Priority Data

May 14, 2004    (JP) ............................. 2004-145180

(51) Int. Cl.
*H02K 21/00*     (2006.01)
(52) U.S. Cl. ...................... 318/254; 318/138; 318/439; 318/432; 318/434; 318/700; 318/701; 318/717
(58) Field of Classification Search ................ 318/138, 318/254, 439, 599, 432–434, 700–800
See application file for complete search history.

(56) References Cited

U.S. PATENT DOCUMENTS

| | | | | |
|---|---|---|---|---|
| 4,454,461 A | * | 6/1984 | Blaschke et al. | 318/717 |
| 5,107,159 A | * | 4/1992 | Kordik | 310/156.44 |
| 5,608,300 A | * | 3/1997 | Kawabata et al. | 318/721 |
| 6,046,655 A | * | 4/2000 | Cipolla | 333/137 |
| 6,069,467 A | * | 5/2000 | Jansen | 318/802 |
| 6,396,229 B1 | * | 5/2002 | Sakamoto et al. | 318/439 |
| 6,552,509 B1 | * | 4/2003 | Veltman | 318/807 |
| 6,555,988 B1 | * | 4/2003 | Masaki et al. | 318/721 |
| 6,580,247 B1 | * | 6/2003 | Nakazawa | 318/700 |

(Continued)

FOREIGN PATENT DOCUMENTS

| | | |
|---|---|---|
| JP | A-05-130710 | 5/1993 |
| JP | A-2004-032947 | 1/2004 |

OTHER PUBLICATIONS

A. Tozune et al, "Effects of constructional asymmetries on the characteristics of 2-phase permanent magnet sychonous motors", May 1989, IEEE.*

*Primary Examiner*—Rina Duda
*Assistant Examiner*—Tyrone Smith
(74) *Attorney, Agent, or Firm*—Oliff & Berridge, PLC (57) ABSTRACT

An electric drive control device is provided with an electric machine having an asymmetrical salient pole, a current detecting portion, a phase converting device that converts the detected current into an axis current, and a current controlling device which generates a voltage command value based on the axis current and a current command value of the axis current. The current controlling device generates the voltage command value in response to the detected current and an offset angle of the center of a magnetic flux density distribution occurring at the salient pole, with respect to the center of an opening angle of the salient pole. In this case, the current controlling device generates a voltage command value corresponding to the detected current and the offset angle so the electrical characteristics are the same as when an electric machine having a symmetrical salient pole is used.

17 Claims, 4 Drawing Sheets

U.S. PATENT DOCUMENTS

| | | | |
|---|---|---|---|
| 6,801,011 B1 * | 10/2004 | Ide | 318/700 |
| 6,828,750 B1 * | 12/2004 | Nakazawa | 318/701 |
| 6,933,701 B1 * | 8/2005 | Kinpara et al. | 318/700 |
| 2001/0024100 A1 * | 9/2001 | Shinnaka | 318/701 |
| 2002/0047447 A1 * | 4/2002 | Torok et al. | 310/181 |
| 2004/0061461 A1 * | 4/2004 | Tajima et al. | 318/254 |
| 2004/0232862 A1 * | 11/2004 | Wogari et al. | 318/254 |
| 2005/0017588 A1 | 1/2005 | Yamaguchi | |

* cited by examiner

ELECTRIC DRIVE CONTROL DEVICE, ELECTRIC DRIVE CONTROL METHOD, AND PROGRAM OF SAME

This application claims priority from JP 2004-145180, filed May 14, 2004, the disclosure of which is incorporated herein in its entirety.

BACKGROUND

The disclosure relates to an electric drive control device, electric drive control method, and program of same.

Conventionally, an electric drive device mounted in a vehicle, such as an electric vehicle, for example, and designed to generate drive motor torque, i.e., torque of a drive motor which is an electric machine, transmits the drive motor torque to driven wheels, generating driving force.

Also, an electric drive device mounted in a hybrid type electric vehicle, which transmits a portion of engine torque, i.e., torque generated by the engine, to a generator (generator/motor) which is a first electric machine, and the rest of the engine torque to the driven wheels, is provided with a planetary gear unit having a sun gear, a ring gear, and a carrier. The carrier is coupled to the engine, the ring gear is coupled to the driven wheels, and the sun gear is coupled to the generator, such that rotation output from the ring gear and a drive motor, which is a second electric machine, is transmitted to the driven wheels, generating driving force.

Moreover, the drive motor control device, which is an electric machine control device, is provided in the electric vehicle, and the generator control device serving as a first electric machine control device, as well as a drive motor control device serving as a second electric machine control device, is provided in the hybrid type electric vehicle. A pulse width modulation signal for a U phase, a V phase, and a W phase generated in the generator control device and the drive motor control devices is sent to an inverter. The inverter then generates phase currents, i.e., currents for the U phase, V phase, and W phase, which are supplied to each stator coil of the generator and the drive motors. As a result, asynchronous pulse width modulation (PWM) control is performed which drives both the generator so that generator torque, i.e., torque generated by the generator, is generated, and the drive motor so that drive motor torque is generated.

In the drive motor control device, for example, a d axis is established in a direction of a pair of magnetic poles in a rotor, and a q axis is established in a direction perpendicular to the d axis based on the positions of the magnetic poles of the rotor. Feedback control is then performed according to a vector control calculation on the d-q axis.

Therefore, the drive motor control device detects the current supplied to each stator coil, the positions of the magnetic poles (hereinafter referred to simply as "magnetic pole position") of the rotor, the direct current voltage on the input side of the inverter, and the like. The detected current is converted into a d-axis current and a q-axis current based on the magnetic pole position. A d-axis current command value indicative of the d-axis current and a q-axis current command value indicative of the q-axis current are then calculated based on the direct current voltage, drive motor target torque indicative of a target value of the drive motor torque, and the like. The drive motor control device then generates a d-axis voltage command value and a q-axis voltage command value so that the difference between the d-axis current and the d-axis current command value, as well as the difference between the q-axis current and the q-axis current command value, become zero (0). The drive motor control device then generates voltage command values by converting the d-axis voltage command value and the q-axis voltage command value into voltage command values for the U phase, the V phase, and the W phase based on the magnetic pole position. The drive motor control device then generates the pulse width modulation signals based on the voltage command values.

When performing the vector control calculation, the d-axis current and the q-axis current are both estimated based on a voltage equation on the d-q axis. The estimated d-axis current and q-axis current are then used to calculate the aforementioned differences. A d-axis inductance Ld and a q-axis inductance Lq of the drive motor are used as parameters to prevent the d-axis current and the q-axis current from interfering with one another (i.e., to isolate them from one another) in order to increase the accuracy of the feedback control (see Japanese Patent Application Laid Open No. 5-130710, for example).

When a motor employing both magnet torque and reluctance torque is used as the drive motor, a salient pole is provided to make a permanent magnet, which generates the magnet torque on the d-axis of the rotor, generate reluctance torque on the q-axis. The magnet torque and the reluctance torque can be changed by changing current phases indicative of the position of an electromagnet created by supplying current to a stator coil.

In particular, if a motor having an asymmetrical salient pole, i.e., if an asymmetrical salient pole motor, is used, magnet torque is able to be sufficiently utilized and total torque which is the sum of the magnet torque and the reluctance torque is able to be sufficiently generated. Moreover, the current phase when field weakening control is performed may be reduced, thereby making it possible to prevent a decrease in the total torque (see Japanese Patent Application Laid Open No. 2004-32947 (family member in U.S. patent Publication 2005/0017588 A1), for example).

SUMMARY

In the drive motor control device of the related art, however, when an asymmetrical salient pole motor is used as the drive motor, the electrical characteristics are different from when a motor having a symmetrical salient pole, i.e., a symmetrical salient pole motor, is used. As a result, when the d-axis current and the q-axis current are estimated based on the voltage equation and the d-axis current and the q-axis current are isolated and the back electromotive voltage is compensated for, undershooting or overshooting may occur in the feedback control, resulting in a decline in the transitional characteristics of the feedback control.

In order to solve the problems of the drive motor control device of the related art, the described embodiment provides an electric drive control device, electric drive control method, and program therefor, which is able to prevent a decline in the transitional characteristics of the feedback control when an asymmetrical salient pole motor is used as a drive motor.

Accordingly, an electric drive control device has an electric machine having an asymmetrical salient pole; a current detecting portion that detects a current supplied to the electric machine; a phase converting device which converts the current detected by the current detecting portion into an axis current; and a current controlling device which generates, based on the axis current and a current command value of the axis current, a voltage command value for driving the electric machine.

The current controlling device generates the voltage command value in response to the detected current and an offset angle of the center of a magnetic flux density distribution occurring at the salient pole, with respect to the center of an opening angle of the salient pole.

In this case, because the current controlling device generates a voltage command value in response to the detected current and the offset angle of the center of the magnetic flux density distribution occurring at the salient pole, with respect to the center of the opening angle of the salient pole, a decline in the transitional characteristics may be prevented.

Therefore, neither an undershoot nor an overshoot will occur in the feedback control. As a result, it is possible to prevent a decline in the transitional characteristics.

BRIEF DESCRIPTION OF THE DRAWINGS

The detailed description will be made with reference to the drawings in which.

DETAILED DESCRIPTION OF EMBODIMENTS

An electric drive device mounted in an electric vehicle and which generates drive motor torque, which is torque generated by a drive motor which is an electric machine, as well as an electric drive control device which performs that control, will be described. To simplify the description, an inverter 40 and a drive circuit 51 are omitted from FIG. 1.

In the drawing, reference numeral 31 denotes a drive motor which is an asymmetrical salient pole motor. The drive motor 31 (FIG. 3) may be attached, for example, to a drive shaft or the like of an electric vehicle and is provided with a rotor 16 disposed so as to rotate freely, and a stator 18 disposed to the outside, in the circumferential direction, of the rotor 16. The rotor 16 includes a rotor core 19, and permanent magnets 20 arranged at a constant pitch in a plurality of locations in the circumferential direction of the rotor core 19. Pairs of magnetic poles are formed by S poles and N poles of the permanent magnets 20. The stator 18 includes a stator core 26 on which teeth 25 are formed which protrude radially inward in a plurality of locations in the circumferential direction, and stator coils 11 to 13 (FIG. 2) for U phase, V phase, and W phase coils which are wound around the teeth 25.

A pulse-generating magnetic pole position sensor 21, which is a magnetic pole position detecting portion for detecting a magnetic pole position θ of the rotor 16, is provided on an output shaft of the rotor 16. This magnetic pole position sensor 21 generates a magnetic pole position signal SGθ as a sensor output, which it sends to a drive motor control device 45 which is an electric machine control device.

In order to drive the drive motor 31 and run the electric vehicle, direct current from a battery 14 is first converted into phase currents, i.e., current Iu for the U phase, current Iv for the V phase, and current Iw for the W phase, by the inverter 40, which is a current generating device. The phase currents Iu, Iv, and Iw are then supplied to the stator coils 11 to 13, respectively.

Therefore, the inverter 40 is provided with six transistors Tr1 to Tr6, which are switching elements. By sending driving signals generated in a drive circuit 51 to each of the transistors Tr1 to Tr6 to selectively turn them on or off, the inverter 40 is able to generate the phase currents Iu, Iv, and Iw. A power module, such as an insulated gate bipolar transistor (IGBT), formed by combining anywhere from two to six switching elements into one package, or an intelligent power module (IPM) formed by combining drive circuits and the like with an IGBT, may be used as the inverter 40.

A voltage sensor 15 is provided as a voltage detecting portion on the input side when current is supplied from the battery 14 to the inverter 40. The voltage sensor 15 detects direct current voltage Vdc on the input side of the inverter 40 and sends it to the drive motor control device 45. The battery voltage may be used as the direct current voltage Vdc. In this case, a battery voltage sensor serving as the voltage detecting portion may be disposed in the battery 14.

The electric drive device includes the drive motor 31, the inverter 40, the drive circuit 51, and driven wheels, not shown, and the like. Further, reference numeral 17 is a condenser.

The stator coils 11 to 13 are star connected, so when the current values of any two of the three phases are determined, the current value of the remaining phase is also determined. Therefore, in order to control the phase currents Iu, Iv, and Iw, current sensors 33, 34, i.e., current detecting portions, which detect the currents Iu, Iv of the U and V phases are provided on lead wires of the stator coils 11, 12 of the U and V phases, for example. The current sensors 33, 34 send the detected currents to the drive motor control device 45 as detected currents iu, iv.

In addition to a CPU, not shown, which functions as a computer, the drive motor control device 45 also includes storage devices, not shown, such as ROM and RAM for storing data and various programs. A current command value map is stored in the ROM. A MPU may be instead of the CPU.

Various programs and data and the like are stored in the ROM, but they may also be stored in another storage medium, such as a hard disk provided as an external storage device. In this case, flash memory, for example, may be provided in the drive motor control device 45, and the programs, data and the like are read from the storage medium and recorded on the flash memory. This enables the programs and data and the like to be updated by simply replacing the external storage medium.

Also, an accelerator sensor 22 is disposed adjacent to an accelerator pedal 23 that serves as an accelerator operating portion. The accelerator sensor 22 detects an accelerator opening amount α indicative of an operating amount (i.e., depression amount) of the accelerator pedal 23.

Next, the drive motor 31 will be described in detail.

The rotor core 19 includes an annular main body portion 50 formed of a magnetic material, such as steel, for example, a retaining portion 65 which is a magnetic portion formed surrounding the permanent magnets 20, and salient poles 57 formed at a constant pitch at the centers between the permanent magnets 20. The retaining portion 65 and the salient poles 57 are radially outward from the main body portion 50. Grooves 58 and 59 are formed between the permanent magnets 20 and the salient poles 57. The retaining portion 65 holds the permanent magnets 20 in place against centrifugal force when the rotor 16 is rotated.

When a line indicative of the center of an opening angle of one of the salient poles 57, i.e., a center line (a line connecting the center of the opening angle of the salient pole 57 in the rotational direction of the rotor 16 with the axis of the rotor 16) is made ϵ1 and a center line of the opening angle of one of the permanent magnets 20 (a line connecting the center of the opening angle of the permanent magnet 20 in the rotational direction of the rotor 16 with the axis of the rotor 16) is made ϵ2, the center line ϵ1 is made to match the center line of the angle formed by two of the center lines ϵ2.

The permanent magnet 20 is formed on a d-axis established by the center line ϵ2 and generates magnet torque by changing a current phase β indicative of the position of an electromagnet created by supplying current to the stator coils 11 to 13. Further, the salient pole 57 is formed on a q-axis established by the center line ϵ1 and generates reluctance torque by changing the current phase β. The q-axis is set in a position ahead of the d-axis by an electrical angle of 90 (°).

The shape of the salient pole 57 is asymmetrical with respect to the center line E:1. When the downstream side in the rotational direction of the permanent magnet 20 (i.e., in the direction of arrow A) is regarded as in front (to the right in FIG. 3) and the upstream side is regarded as in back (to the left in FIG. 3), a tapered portion which rises slanting toward the back is provided in a predetermined forward region on the outer peripheral edge of the salient pole 57. In this exemplary embodiment, this predetermined region is a first region (mainly the front half portion of the salient pole 57) extending from the front end of the salient pole 57 (i.e., the right end in FIG. 3) to a set location slightly ahead of the center line ϵ1. A flat (i.e., level) portion extending in the circumferential direction of the rotor 16 is formed in a second region (mainly the back half portion of the salient pole 57) which extends from the back end of the first region (i.e., the left end in FIG. 3) to the back end of the salient pole 57.

In this case, the salient pole 57 is formed of a magnetic body, such as steel, integrated with a main body 50 while the permanent magnet 20 is equivalent to an air gap in terms of the ease of passage of the magnetic flux. As a result, the air gap is smaller by the amount that the salient pole 57 protrudes toward the stator core 26, i.e., protrudes radially outward.

Forming a tapered portion in the first region therefore increases the air gap between the rotor 16 and the stator 18 on the downstream side of the center line ϵ1 in the rotational direction of the rotor 16.

In terms of the salient pole 57 on the whole, magnetomotive force generated by the q-axis current iq flowing through the windings of the stator coils 11 to 13 offsets the center of the magnetic flux density distribution generated at the salient pole 57 from the center of the opening angle of the salient pole 57 by a predetermined offset (i.e., deviation) angle (by an angle δ in this exemplary embodiment) in the direction opposite the direction of rotation of the rotor 16. The angle δ is expressed as a deviation angle from the q-axis to the current phase β where reluctance torque starts to be generated. Therefore, the reluctance torque can be calculated by subtracting the magnet torque estimated based on a drive motor torque TM which is the measured torque generated by the drive motor 31, and the current phase β when it becomes zero can be set as the angle δ.

This is equivalent to the q-axis for the reluctance torque being placed in a position offset in the direction opposite the direction of rotation of the rotor 16 by an electrical angle of a predetermined angle δ. As a result, even if the current phase is 0 (°) when viewed from the offset q-axis, reluctance torque can still be generated and a current phase at which the reluctance torque becomes the maximum value approaches 0 (°) from 45 (°) Therefore, the current phase at which the total torque becomes the maximum value approaches 0 (°), and at that time, the magnet torque assumes a value near the maximum value. As a result, the magnet torque is able to be utilized sufficiently, thereby enabling the drive motor 31 to be made smaller.

When the drive motor 31 is driven in the high speed range such that the angular speed ω increases, the value ω×Lq indicative of the product of the q-axis inductance Lq multiplied by the angular speed ω becomes that much larger. As a result, the output of the drive motor 31 is unable to increase. Therefore, when the drive motor 31 is driven in the high speed range, field weakening control is performed by advancing the current phase β by a predetermined amount.

In this exemplary embodiment, the center of the magnetic flux density distribution generated at the salient pole 57 is offset by the angle δ in the direction opposite the direction of rotation of the rotor 16 due to magnetomotive force generated when the q-axis current iq flows through the winding. As a result, the q-axis inductance Lq on the power running side is smaller by a corresponding amount than it is with a salient pole 57 of normal shape. Therefore, the current phase β when performing the field weakening control can be decreased by a corresponding amount. As a result, it is possible to prevent a decrease in the total torque and therefore increase the output generated by the drive motor 31.

Next, operation of the drive motor control device 45 (FIG. 1) will be described.

First, a magnetic pole position calculating portion 46 which is a magnetic pole position calculating device of the drive motor control device 45 performs a magnetic pole position calculating process, in which it reads the magnetic pole position signal SGθ sent from the magnetic pole position sensor 21 and calculates the magnetic pole position θ based on the magnetic pole position signal SGθ. That is, the magnetic pole position calculating portion 46 calculates the average speed between pulses generated by the magnetic pole position signal SGθ as the angular speed ω of the drive motor 31, and then calculates the magnetic pole position θ according to that angular speed ω. A speed calculating device (not shown) of the drive motor control device 45 performs a speed calculation process in which it calculates, based on the angular speed ω, a drive motor speed NM $$NM = 60 \times \omega / 2\pi$$

as the electric machine speed, which is the rotation speed of the drive motor 31.

Next, a drive motor controlling device (not shown) of the drive motor control device 45 performs drive motor control processing, by which it drives the drive motor 31 based on the detected currents iu, iv, and iw, the magnetic pole positions θ, the direct current voltage Vdc, and the like.

When an asymmetrical salient pole motor of the above described structure is used as the drive motor 31, the q-axis for the reluctance torque is in a position offset by an electrical angle of a predetermined angle δ in the direction opposite the direction of rotation of the rotor 16, as described above. In this exemplary embodiment, a q'-axis is established offset from the q-axis by an angle δ in the direction opposite the direction of rotation of the rotor 16, and subsequently, a d'-axis is also established offset from the d-axis by the angle δ in the direction opposite the direction of rotation of the rotor 16. Feedback control is then performed by vector control calculation on this d'-q' axis.

In this case, when the armature current is Ia, the d-axis current id and the q-axis current iq on the d-q axis are as follows.

$$id = -Ia \times \sin\beta$$

$$iq = Ia \times \cos\beta$$

On the other hand, the d-axis current id' and the q-axis current iq' on the d'-q' axis are as follows.

$$id' = -Ia \times \sin(\beta - \delta)$$

$$iq' = Ia \times \cos(\beta - \delta)$$

Therefore, the relationship between the d-axis current id and the q-axis current iq, and the d-axis current id' and the q-axis current iq' is as noted in Expression 1 below.

[Expression 1]

$$\begin{bmatrix} id' \\ iq' \end{bmatrix} = \begin{bmatrix} \cos\delta & \sin\delta \\ -\sin\delta & \cos\delta \end{bmatrix} \cdot \begin{bmatrix} id \\ iq \end{bmatrix} \qquad (1)$$

In Expression 1, the matrix comprising $\cos\delta$ and $\sin\delta$ forms an axis conversion matrix for converting the d-q axis into a d'-q' axis. When Expression 1 is expanded further, we get the following.

$$id' = \cos\delta \times id + \sin\delta \times iq$$

$$iq' = -\sin\delta \times id + \cos\delta \times iq$$

The d-axis current id' is created by the sum of the d-axis current components and the q-axis current iq' is created by the sum of the q-axis current components.

In this case, as the d-q axis is converted into the d'-q' axis, the salient pole 57 is placed in a reference position and the permanent magnet 20 is placed offset by the angle δ. A reference axis, which is a first axis, is formed by the d-q axis and a conversion axis, which is the second axis, is formed by the d'-q' axis. Also, the d-axis currents id and id' and the q-axis currents iq and iq' constitute an axis current.

A current command value calculating device of the drive motor controlling device performs a current command value calculation process by which it calculates a d-axis current command value id'* and a q-axis current command value iq'* indicative of target values for the d-axis current id' and the q-axis current iq', respectively, on the d'-q' axis. For this, a vehicle speed detecting device (not shown) of the drive motor control device 45 performs a vehicle speed detection process by which it detects a vehicle speed V corresponding to the drive motor speed NM, and sends that detected vehicle speed V to a vehicle control device (not shown) which performs overall control of the electric vehicle. A vehicular command value calculating device of the vehicle control device then performs a vehicular command value calculation process in which it reads the vehicle speed V and accelerator opening amount α, calculates a vehicle required torque TO* based on the vehicle speed V and the accelerator opening amount α, and generates a drive motor target torque (torque command value) TM* indicative of a target value of the drive motor torque TM corresponding to the vehicle required torque TO*, which it then sends to the drive motor control device 45. The drive motor target torque TM* constitutes an electric machine target torque.

The current command value calculating device reads the direct current voltage Vdc, the angular speed ω, and the drive motor target torque TM* and calculates a d-axis current command value id* and a q-axis current command value iq* on the d-q line that corresponds to the drive motor target torque TM* by referring to the current command value map.

Continuing on, an axis converting device of the drive motor control device performs an axis conversion process by which it converts the d-axis current command value id* and the q-axis current command value iq* into the d-axis current command value id'* and the q-axis current command value iq'* on the d'-q' line according to Expression 2 below.

[Expression 2]

$$\begin{bmatrix} id'^* \\ iq'^* \end{bmatrix} = \begin{bmatrix} \cos\delta & \sin\delta \\ -\sin\delta & \cos\delta \end{bmatrix} \cdot \begin{bmatrix} id^* \\ iq^* \end{bmatrix} \qquad (2)$$

The d-axis current command value id'* and the q-axis current command value iq'* constitute a current command value.

Next, a detected current obtaining device of the drive motor controlling device performs a detected current obtaining process in which it reads and obtains the detected currents iu and iv while a computing unit 35 of the detected current obtaining device obtains the detected current iw $$iw = -iu - iv$$

by calculating it based on the detected currents iu and iv.

Next, a three-phase/two-phase converting portion 61 (FIG. 1) serving as a first phase converting device of the drive motor controlling device performs a three-phase/two-phase conversion as a first conversion process, by which it reads the magnetic pole position θ and then converts each of the detected currents iu, iv, and iw into a d-axis current id' and a q-axis current iq' on the d'-q' axis according to Expression 3 below.

[Expression 3]

$$\begin{bmatrix} id' \\ iq' \end{bmatrix} = \sqrt{\frac{2}{3}} \begin{bmatrix} \cos(\omega t + \delta) & \cos\left(\omega t - \frac{2}{3}\pi + \delta\right) & \cos\left(\omega t + \frac{2}{3}\pi + \delta\right) \\ -\sin(\omega t + \delta) & -\sin\left(\omega t - \frac{2}{3}\pi + \delta\right) & -\sin\left(\omega t + \frac{2}{3}\pi + \delta\right) \end{bmatrix} \cdot \begin{bmatrix} iu \\ iv \\ iw \end{bmatrix} \qquad (3)$$

Here, t represents time. Once the detected currents iu, iv, and iw have been converted into d-axis currents id and q-axis currents iq on the d-q axis, the d-axis currents id' and the q-axis currents iq' can then be calculated according to Expression 1.

In this way, when the d-axis current id' and the q-axis current iq' are calculated as actual currents and the d-axis current command value id'* and the q-axis current command value iq'* are calculated, feedback control is then performed according to a vector control calculation based on the d-axis current id' and the q-axis current iq', together with the d-axis current command value id'* and the q-axis current command value iq'*.

When a d-axis voltage on the d'-q' axis is made vd', a q-axis voltage on the d'-q' axis is made vq', and a back electromotive voltage constant is made MIf, the d-axis voltage vd' and the q-axis voltage vq' can be expressed according to Expression 4 below which is a voltage equation on the d'-q' axis.

[Expression 4]

$$\begin{bmatrix} vd' \\ vq' \end{bmatrix} = \begin{bmatrix} Ra & 0 \\ 0 & Ra \end{bmatrix} \cdot \begin{bmatrix} id' \\ iq' \end{bmatrix} + \frac{d}{dt}\begin{bmatrix} Ld & 0 \\ 0 & Lq \end{bmatrix} \cdot \begin{bmatrix} id' \\ iq' \end{bmatrix} + \begin{bmatrix} 0 & -\omega \cdot Lq \\ \omega \cdot Ld & 0 \end{bmatrix} \cdot \begin{bmatrix} id' \\ iq' \end{bmatrix} + \begin{bmatrix} \omega \cdot MIf \cdot \sin\delta \\ \omega \cdot MIf \cdot \cos\delta \end{bmatrix} \quad (4)$$

Thus, a d-axis voltage command value vd'* indicative of a target value for the d-axis voltage vd' and a q-axis voltage command value vq'* indicative of a target value for the q-axis voltage vq' can be expressed according to Expression 5 below.

[Expression 5]

$$\begin{bmatrix} vd'^* \\ vq'^* \end{bmatrix} = \begin{bmatrix} Ra & 0 \\ 0 & Ra \end{bmatrix} \cdot \begin{bmatrix} id'^* \\ iq'^* \end{bmatrix} + \frac{d}{dt}\begin{bmatrix} Ld & 0 \\ 0 & Lq \end{bmatrix} \cdot \begin{bmatrix} id'^* \\ iq'^* \end{bmatrix} + \begin{bmatrix} 0 & -\omega \cdot Lq \\ \omega \cdot Ld & 0 \end{bmatrix} \cdot \begin{bmatrix} id'^* \\ iq'^* \end{bmatrix} + \begin{bmatrix} \omega \cdot MIf \cdot \sin\delta \\ \omega \cdot MIf \cdot \cos\delta \end{bmatrix} \quad (5)$$

When feedback control is performed based on Expression 5, the first term on the right side of Expression 4 represents integral components Vzdi' and Vzqi' of voltage drop components Vzd' and Vzq' generated in a resistance Ra of the stator coils 11 to 13, and the second term represents proportional components Vzdp' and Vzqp' of the voltage drop components Vzd' and Vzq', such that the voltage drop components Vzd' and Vzq' become the following.

$Vzd' = Vzdi' + Vzdp'$ $Vzq' = Vzqi' + Vzqp'$

Further, the sum of the third and fourth terms in Expression 4 represents induced voltage components ed' and eq' generated by the q-axis current iq' and the d-axis current id', wherein:

$ed' = \omega \times (-Lq \times iq' + MIf \times \sin\delta)$ $eq' = \omega \times (Ld \times id' + MIf \times \cos\delta)$ In this case, the value $-\omega \times Lq \times iq'$ is a value which compensates for the voltage generated by the q-axis current iq' flowing through the stator coils 11 to 13, the value $\omega \times Ld \times id'$ is a value which compensates for the voltage generated by the d-axis current id' flowing through the stator coils 11 to 13, and the values $\omega \times MIf \times \sin\delta$ and $\omega \times MIf \times \cos\delta$ are values which compensate for the back electromotive voltage.

If a driver depresses the accelerator pedal 23 so that the vehicle takes off suddenly, for example, the d-axis current command value id'* and the q-axis current command value iq'* fluctuate rapidly, but if the sampling cycle of the detected currents iu, iv, and iw is long, the gain is not able to be increased when feedback control is performed. Therefore, the d-axis current id' and q-axis current iq' are estimated after a predetermined period of time (after an extremely short period of time Δt, in this exemplary embodiment) has passed based on the detected currents iu, iv, and iw, making the sampling cycle substantially shorter.

If in Expression 4

[Expression 6]

$$\begin{bmatrix} vzd' \\ vzq' \end{bmatrix} = \begin{bmatrix} Ra & 0 \\ 0 & Ra \end{bmatrix} \cdot \begin{bmatrix} id' \\ iq' \end{bmatrix} + \frac{d}{dt}\begin{bmatrix} Ld & 0 \\ 0 & Lq \end{bmatrix} \cdot \begin{bmatrix} id' \\ iq' \end{bmatrix} \quad (6)$$

then

[Expression 7]

$$\frac{d}{dt}\begin{bmatrix} id' \\ iq' \end{bmatrix} = \left[\begin{bmatrix} vzd' \\ vzq' \end{bmatrix} - \begin{bmatrix} Ra \cdot id' \\ Ra \cdot iq' \end{bmatrix}\right] \cdot \begin{bmatrix} \frac{1}{Ld} \\ \frac{1}{Lq} \end{bmatrix} \quad (7)$$

Therefore, when the d-axis current after the extremely short period of time Δt has passed is made idp'

$idp' = id' + \Delta id'$ and the q-axis current after extremely short period of time Δt has passed is made iqp'

$iqp' = iq' + \Delta iq'$ the d-axis current idp' and the q-axis current iqp' are as expressed by Expression 8 below.

[*Expression* 8]

$$\begin{bmatrix} idp' \\ iqp' \end{bmatrix} = \left[\begin{bmatrix} vzd' \\ vzq' \end{bmatrix} - \begin{bmatrix} Ra \cdot id' \\ Ra \cdot iq' \end{bmatrix}\right] \cdot \begin{bmatrix} \frac{1}{Ld} \\ \frac{1}{Lq} \end{bmatrix} \cdot \Delta t + \begin{bmatrix} id' \\ iq' \end{bmatrix} \quad (8)$$

In this exemplary embodiment, the detected currents iu, iv, and iw are estimated as the d-axis current id' and the q-axis current iq' after sampling, and the d-axis current id' and q-axis current iq' after just one sampling timing are estimated as the d-current idp' and the q-axis current iqp'.

Also, when estimating the d-axis current idp' and the q-axis current iqp', if the currents Iu, Iv, and Iw supplied to the stator coils 11 to 13 change such that the d-axis inductance Ld and the q-axis inductance Lq of the stator coils 11 to 13 change, for example, it may cause an estimated current error to occur in the d-axis-current idp' and the q-axis current iqp'. In this case, when a difference between the d-axis current idp' and the d-axis current command value id'* is made d-axis current deviation εidp' and a difference between the q-axis current iqp' and the q-axis current command value iq'* is made q-axis current deviation εiqp' and feedback control is performed, it is difficult to bring the d-axis current deviation εidp' and the q-axis current deviation εiqp' close to zero so a continuous deviation occurs between the d-axis current idp' and the q-axis current iqp' and the d-axis current command value id'* and the q-axis current command value iq'*.

Thus, in this exemplary embodiment, proportional control is performed based on the estimated d-axis current idp' and q-axis current iqp', and integral control is performed based on the current d-axis current id' and q-axis current iq'.

Figure 1:
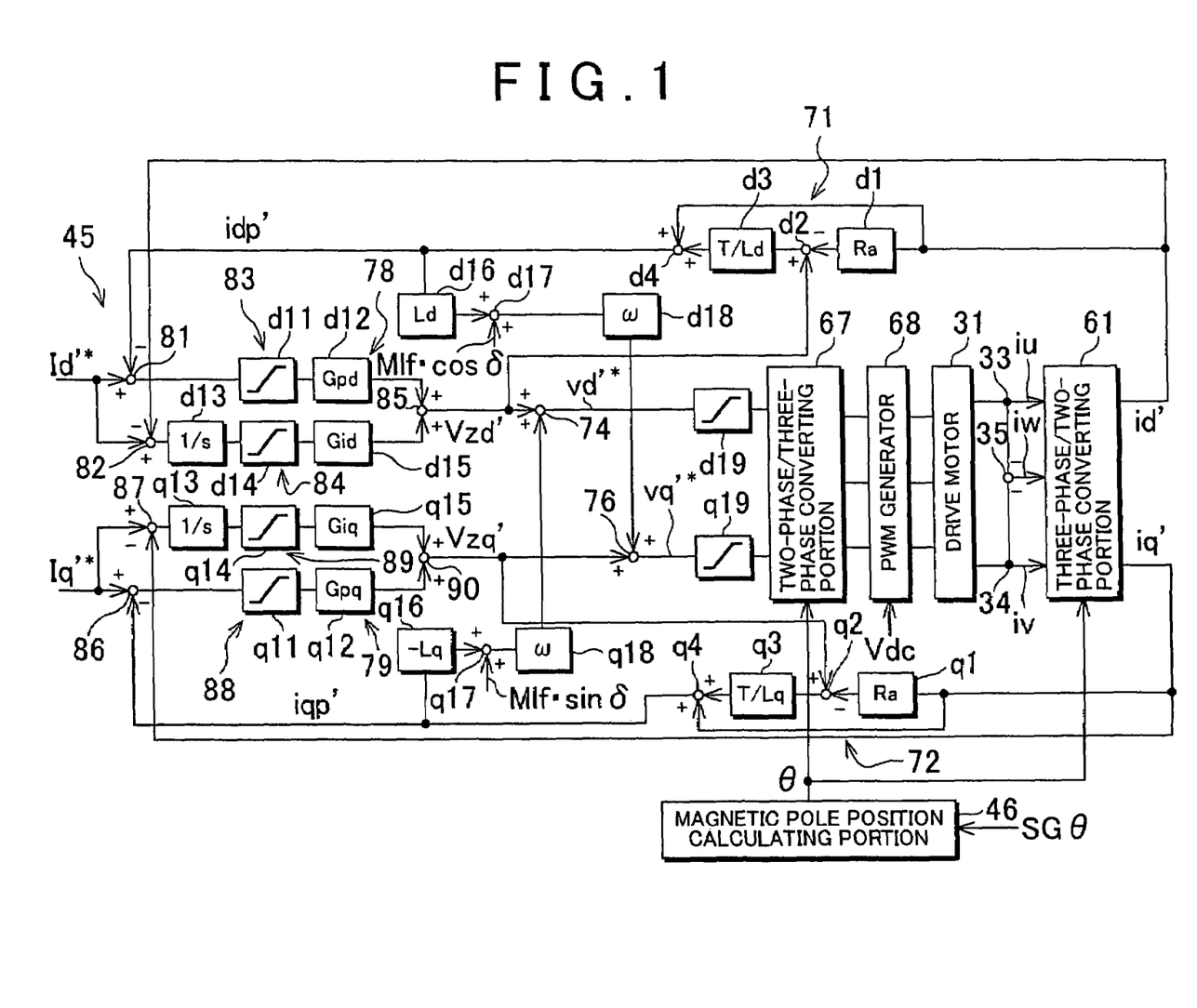
FIG. 1 is a block diagram of an electric drive control device according to a first exemplary embodiment.

Therefore, on one hand, the d-axis current id', that was converted in the three-phase/two-phase converting portion 61, is sent to a current estimating portion 71 which is a current estimating device of the drive motor controlling device. The current estimating portion 71 then performs a current estimation process in which it estimates, through calculation, the d-axis current idp'. The d-axis current idp' is then sent as an estimated current to a subtracter 81 which is an estimated deviation calculating device of the drive motor controlling device. On the other hand, the aforementioned d-axis current id' is also sent as it is as an actual current to a subtracter 82 which is an actual deviation calculating device of the drive motor controlling device.

The current estimating portion 71 is provided with a multiplier (Ra) d1, a subtracter d2, a multiplier (T/Ld) d3, and an adder d4. When the sampling cycle is T, the estimated d-axis current idp' becomes $$idp' = id' + (T/Ld)(Vzd' - Ra \times id')$$

by substituting the sampling cycle T for the extremely short period of time $\Delta t$ in Expression 8.

The subtracter 81 performs an estimated deviation calculation process in which it calculates the d-axis current deviation $\epsilon idp'$ as the estimated deviation between the d-axis current idp' and the d-axis current command value id'*. The subtracter 82 performs an actual deviation calculation process in which it calculates the d-axis current deviation $\epsilon id'$ as the actual deviation between the d-axis current id' and the d-axis current command value id'*, and sends the d-axis current deviations $\epsilon idp'$ and $\epsilon id'$ to a voltage command value calculating portion 78 which is both a proportional/integral calculating device and a voltage command value calculating device of the drive motor controlling device.

Similarly, on one hand, the q-axis current iq' that was converted in the three-phase/two-phase converting portion 61 is sent to a current estimating portion 72 which is a current estimating device. The current estimating portion 72 then performs a current estimation process in which it estimates, through calculation, the q-axis current iqp'. This q-axis current iqp' is then sent as an estimated current to a subtracter 86 which is an estimated deviation calculating device of the drive motor controlling device. On the other hand, the aforementioned q-axis current iq' is also sent as it is as an actual current to a subtracter 87 which is an actual deviation calculating device of the drive motor controlling device.

The current estimating portion 72 is provided with a multiplier (Ra) q1, a subtracter q2, a multiplier (T/Lq) q3, and an adder q4. The estimated q-axis current iqp' becomes $$iqp' = iq' + (T/Lq)(Vzq' - Ra \times iq')$$

by substituting the sampling cycle T for the extremely short period of time $\Delta t$ in Expression 8.

The subtracter 86 performs an estimated deviation calculation process in which it calculates a q-axis current deviation $\epsilon iqp'$ as the estimated deviation between the q-axis current iqp' and the q-axis current command value iq'*. The subtracter 87 performs an actual deviation calculation process in which it calculates the q-axis current deviation $\epsilon iq'$ as the actual deviation between the q-axis current iq' and the q-axis current command value iq'*, and sends the q-axis current deviations $\epsilon iqp'$ and $\epsilon iq'$ to a voltage command value calculating portion 79 which is both a proportional/integral calculating device and a voltage command value calculating device of the drive motor controlling device.

Continuing on, the voltage command value calculating portions 78, 79 perform a voltage command value calculation process and a proportional/integral (PI) calculation process. Here, the voltage command value calculating portion 78 calculates the d-axis voltage command value vd'* in Expression 5 such that the d-axis current deviations $\epsilon idp'$ and $\epsilon id'$ become zero and the voltage command value calculating portion 79 calculates the q-axis voltage command value vq'* in Expression 5 so that the q-axis current deviations $\epsilon iqp'$ and $\epsilon iq'$ become zero. The d-axis voltage command value vd'* and q-axis voltage command value vq'* constitute a voltage command value. Also, the voltage command value calculating portions 78, 79 constitute a current controlling device. The current controlling device performs a current control process in which it generates the d-axis current command value vd'* and q-axis voltage command value vq'*.

Therefore, the voltage command value calculating portion 78 includes a proportional calculating portion 83 which is a proportional calculating device, an integral calculating portion 84 which is an integral calculating device, an adder 85 which is a voltage drop component calculating device, and an adder 74 which is a command value calculating device. The proportional calculating portion 83 performs a proportional calculation process using a limiter d11 and a gain multiplier (Gpd) d12, in which it calculates a proportional component Vzdp'

$$Vzdp' = Gpd' \times \epsilon idp'$$

as a proportional calculation value based on the d-axis current deviation $\epsilon idp'$ and a gain Gpd' for the proportional calculation. The integral calculating portion 84 performs an integral calculation process using an integrator (1/s) d13, a limiter d14, and a gain multiplier (Gid) d15, in which it calculates an integral component Vzdi'

$$Vzdi' = Gid' \times \Sigma \epsilon id'$$

as an integral calculation value based on the d-axis current deviation $\epsilon id'$ and a gain Gid' for the integral calculation. The adder 85 performs a voltage drop component calculation process in which it adds the integral component Vzdi' and the proportional component Vzdp' to calculate the voltage drop component Vzd'

$$Vzd' = Vzdi' + Vzdp' = Gid' \times \Sigma \epsilon id' + Gpd' \times \epsilon idp'$$

The limiter d11 limits the d-axis current deviation $\epsilon idp'$ so that it will not diverge and the limiter d14 limits the integral value $\Sigma \epsilon id'$ so that it will not diverge.

Also, the voltage command value calculating portion 78 is provided with an induced voltage component calculating device. The induced voltage component calculating device includes a multiplier (−Lq) q16, an adder q17, and a multiplier (ω) q18 and performs an induced voltage component calculation process in which it reads the angular speed ω, the q-axis current iqp', the back electromotive voltage constant MIf, and the angle δ, and calculates an induced voltage component ed'

$$ed' = \omega \times (-Lq \times iqp' + MIf \times \sin\delta)$$

which is induced by the q-axis current iqp'. In this case, the value $\omega \times MIf \times \sin\delta$ is a value that compensates for the back electromotive voltage generated by the q-axis current iqp' flowing through the stator coils 11 to 13.

Continuing on, the adder 74 performs a command value calculation process in which it calculates the d-axis voltage command value vd'*

$$vd'^* = Vzd' + ed' = Vzd' + \omega \times (-Lq \times iqp' + MIf \times \sin\delta)$$

as an output voltage by adding the induced voltage component ed' to the voltage drop component Vzd' sent from the adder 85. In this way, the d-axis voltage command value vd'* is generated so that the d-axis current deviations εidp' and εid' become zero. This d-axis voltage command value vd'* is then sent via a limiter d19 to a two-phase/three-phase converting portion 67 which is a second phase converting device of the drive motor control device 45. The limiter d19 limits the d-axis voltage command value vd'* so that it will not diverge.

Meanwhile, the voltage command value calculating portion 79 includes a proportional calculating portion 88 which is a proportional calculating device, an integral calculating portion 89 which is an integral calculating device, an adder 90 which is a voltage drop component calculating device, and an adder 76 which is a command value calculating device. The proportional calculating portion 88 performs a proportional calculation process using a limiter q11 and a gain multiplier (Gpq) q12, in which it calculates a proportional component Vzqp'

$$Vzqp' = Gpq' \times \epsilon iqp'$$

as a proportional calculation value based on the q-axis current deviation εiqp' and a gain Gpq' for the proportional calculation. The integral calculating portion 89 performs an integral calculation process using an integrator (1/s) q13, a limiter q14, and a gain multiplier (Giq) q15, in which it calculates an integral component Vzqi'

$$Vzqi' = Giq' \times \Sigma\epsilon iq'$$

as an integral calculation value based on the q-axis current deviation εiq' and a gain Giq' for the integral calculation. The adder 90 performs a voltage drop component calculation process in which it adds the integral component Vzqi' and the proportional component Vzqp' to calculate the voltage drop component Vzq'

$$Vzq' = Vzqi' + Vzqp' = Giq' \times \Sigma\epsilon iq' + Gpq' \times \epsilon iqp'$$

The limiter q11 limits the q-axis current deviation εiqp' so that it will not diverge and the limiter q14 limits the integral value Σεiq' so that it will not diverge.

Also, the voltage command value calculating portion 79 is provided with an induced voltage component calculating device. The induced voltage component calculating device includes a multiplier (Ld) d16, an adder d17, and a multiplier (ω) d18 and performs an induced voltage component calculation process in which it reads the angular speed ω, the d-axis current idp', the back electromotive voltage constant MIf, and the angle δ, and calculates an induced voltage component eq'

$$eq' = \omega \times (Ld \times idp' + MIf \times \cos\delta)$$

which is induced by the d-axis current idp'. In this case, the value ω×MIf×cos δ is a value that compensates for the back electromotive voltage generated by the d-axis current idp' flowing through the stator coils 11 to 13.

Continuing on, the adder 76 performs a command value calculation process in which it calculates the q-axis voltage command value vq'*

$$vq'^* = Vzq' + eq'$$
$$= Vzq' + \omega \times (Ld \times idp' + MIf \times \cos\delta)$$

as an output voltage by adding the induced voltage component eq' to the voltage drop component Vzq' sent from the adder 90. In this way, the q-axis voltage command value vq'* is generated so that the q-axis current deviations εiqp' and εiq' become zero. This q-axis voltage command value vq'* is then sent via a limiter q19 to the two-phase/three-phase converting portion 67. The limiter q19 limits the q-axis voltage command value vq'* so that it will not diverge.

Continuing on, the two-phase/three-phase converting portion 67 reads the d-axis voltage command value vd'*, the q-axis voltage command value vq'*, and the magnetic pole position θ, and performs two-phase/three-phase conversion as a second conversion process, in which it converts the d-axis voltage command value vd'* and the q-axis voltage command value vq'* to voltage command values vu*, vv*, and vw* for the U phase, V phase, and W phase, respectively, in Expression 9 below. The two-phase/three-phase converting portion 67 then sends the voltage command values vu*, vv*, and vw* to a PWM generator 68 which is an output signal calculating device of the drive motor control device 45.

[Expression 9]

$$\begin{pmatrix} vu^* \\ vv^* \\ vw^* \end{pmatrix} = \sqrt{\frac{2}{3}} \begin{pmatrix} \cos(\omega t + \delta) & -\sin(\omega t + \delta) \\ \cos\left(\omega t - \frac{2}{3}\pi + \delta\right) & -\sin\left(\omega t + \frac{2}{3}\pi + \delta\right) \\ \cos\left(\omega t - \frac{2}{3}\pi + \delta\right) & -\sin\left(\omega t + \frac{2}{3}\pi + \delta\right) \end{pmatrix} \cdot \begin{pmatrix} vd'^* \\ vq'^* \end{pmatrix} \quad (9)$$

The PWM generator 68 performs an output signal calculation process in which it generates, as output signals, pulse width modulation signals Mu, Mv, and Mw for each phase which have pulse widths corresponding to the d-axis current command value id'* and the q-axis current command value iq'*, based on both the voltage command values vu*, vv*, and vw* of each phase and the direct current voltage Vdc. The PWM generator 68 then sends the generated pulse width modulation signals Mu, Mv, and Mw to a drive circuit 51 which is provided outside the drive motor control device 45.

Figure 2:
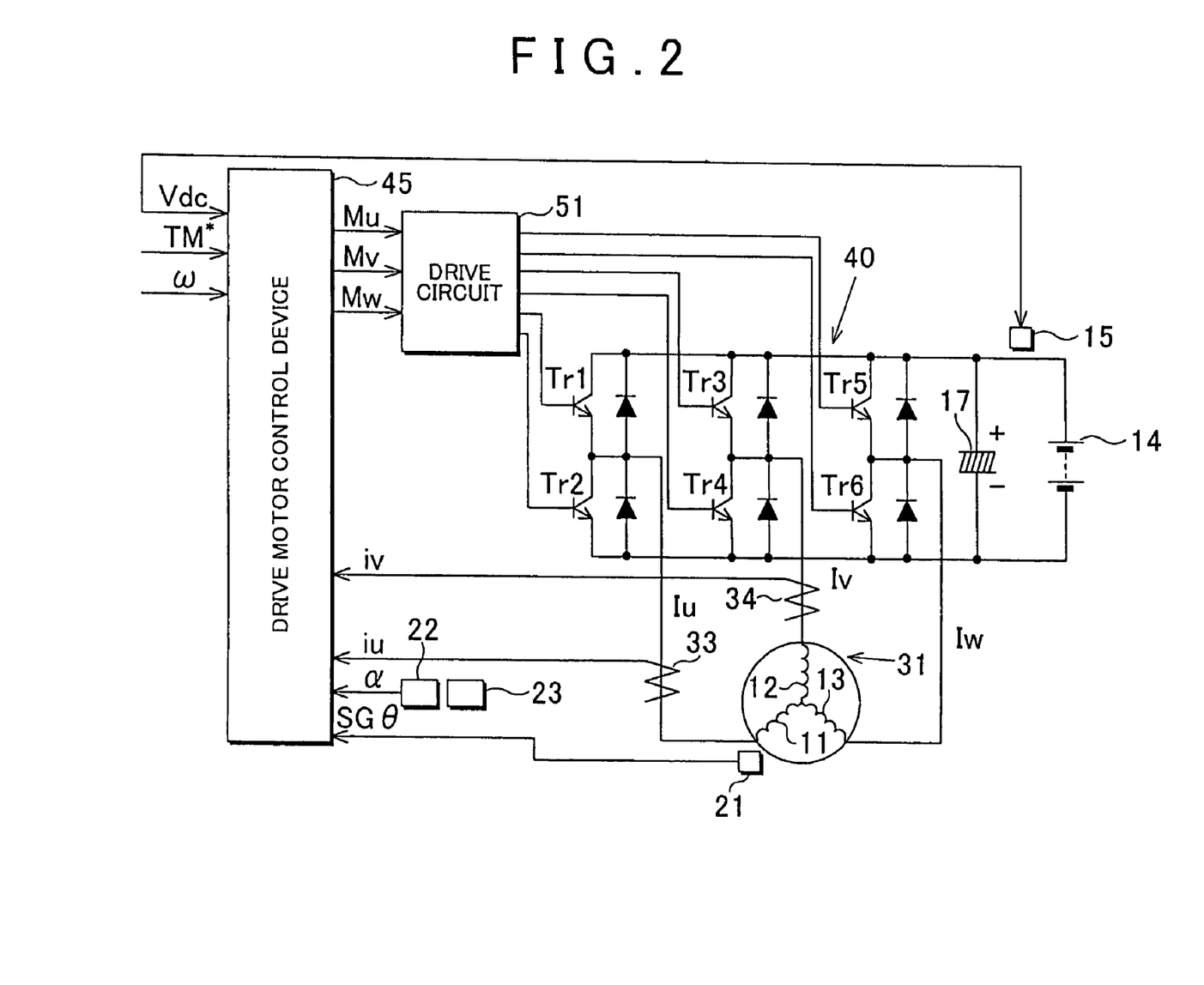
FIG. 2 is a conceptual diagram of the electric drive control device according to the first exemplary embodiment.
Figure 3:
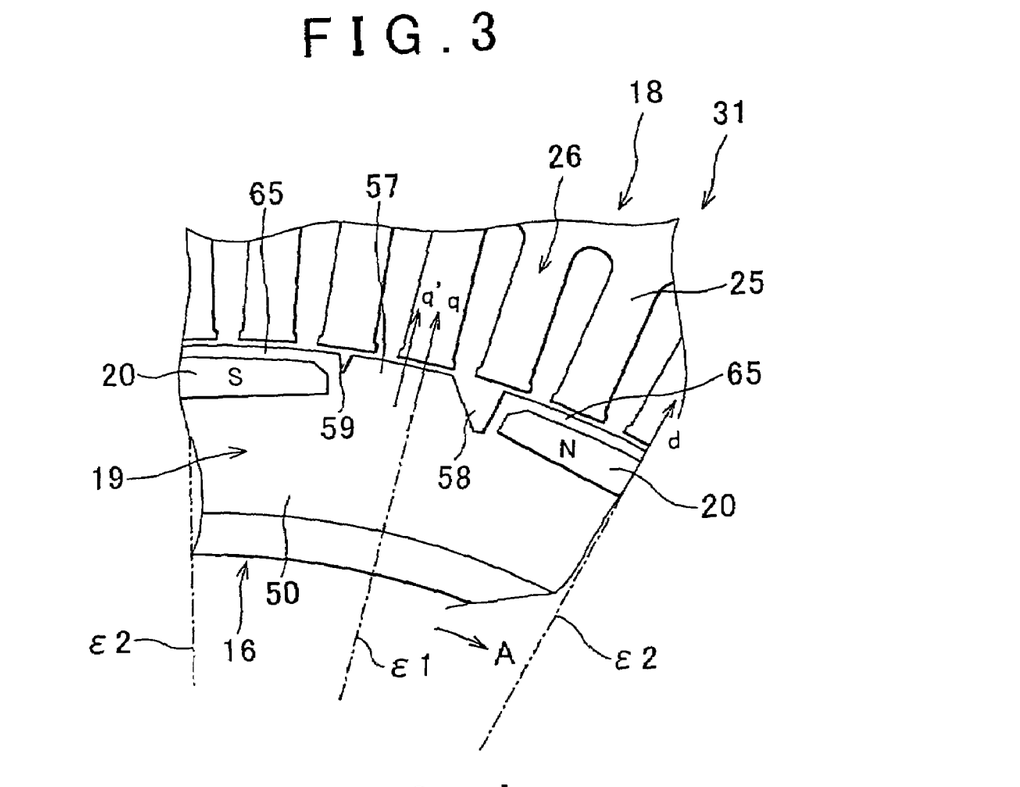
FIG. 3 is a view showing a main portion of a drive motor according to the first exemplary embodiment.
Figure 4:
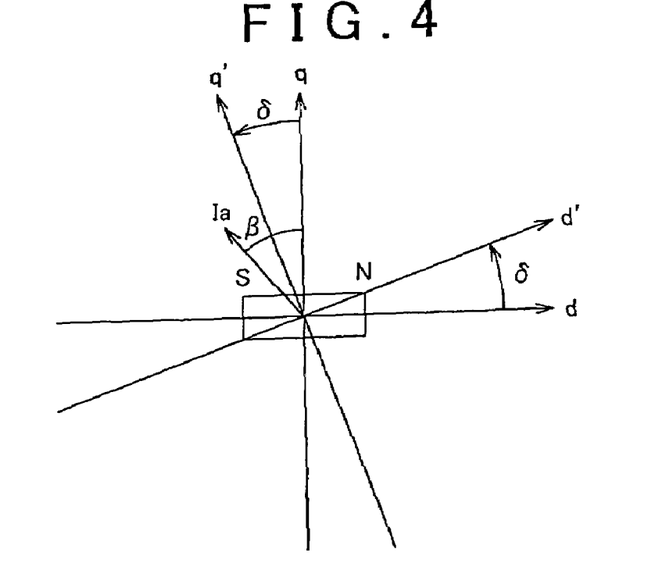
FIG. 4 is a conceptual diagram of a coordinate representation according to the first exemplary embodiment.

The drive circuit 51 receives the pulse width modulation signals Mu, Mv, and Mw of each phase and generates six gate signals which it sends to the inverter 40. Based on the pulse width modulation signals Mu, Mv, and Mw, the inverter 40 switches the transistors Tr1 to Tr6 to generate currents Iu, Iv, and Iw for each phase, which it then supplies to the stator coils 11 to 13 of the drive motor 31. In this way, torque control is performed based on the drive motor target torque TM* and the drive motor 31 is driven to run the electric vehicle.

In this exemplary embodiment, an asymmetrical salient pole motor is used for the drive motor 31. The d-axis current command value id'* and the q-axis current command value iq'* are calculated, and the d-axis voltage command value vd'* and the q-axis voltage command value vq'* are calculated, based on a voltage equation in which, when the center of the magnetic flux density distribution generated at the salient pole 57 is offset by an angle δ with respect to the center of the opening angle of the salient pole 57, the d-q axis is converted to the d'-q' axis by offsetting it by an angle δ, and the salient pole 57 is placed in a reference position and the permanent magnet 20 is placed in a position offset by an angle δ. As a result, the electrical characteristics are the same as when a symmetrical salient pole motor is used for the drive motor 31.

Accordingly, when estimating the d-axis current idp' and the q-axis current iqp' based on the voltage equation, isolating the d-axis current idp' and the q-axis current iqp', and compensating for the back electromotive voltage, neither undershooting nor overshooting will occur in the feedback control, which makes it possible to prevent a decline in the transitional characteristics of the feedback control.

Next, a second exemplary embodiment will be described in which the d-axis voltage command value vd* and the q-axis voltage command value vq* are calculated while the permanent magnet 20 is in a reference position and the salient pole 57 is offset, without converting the d-q axis.

Figure 5:
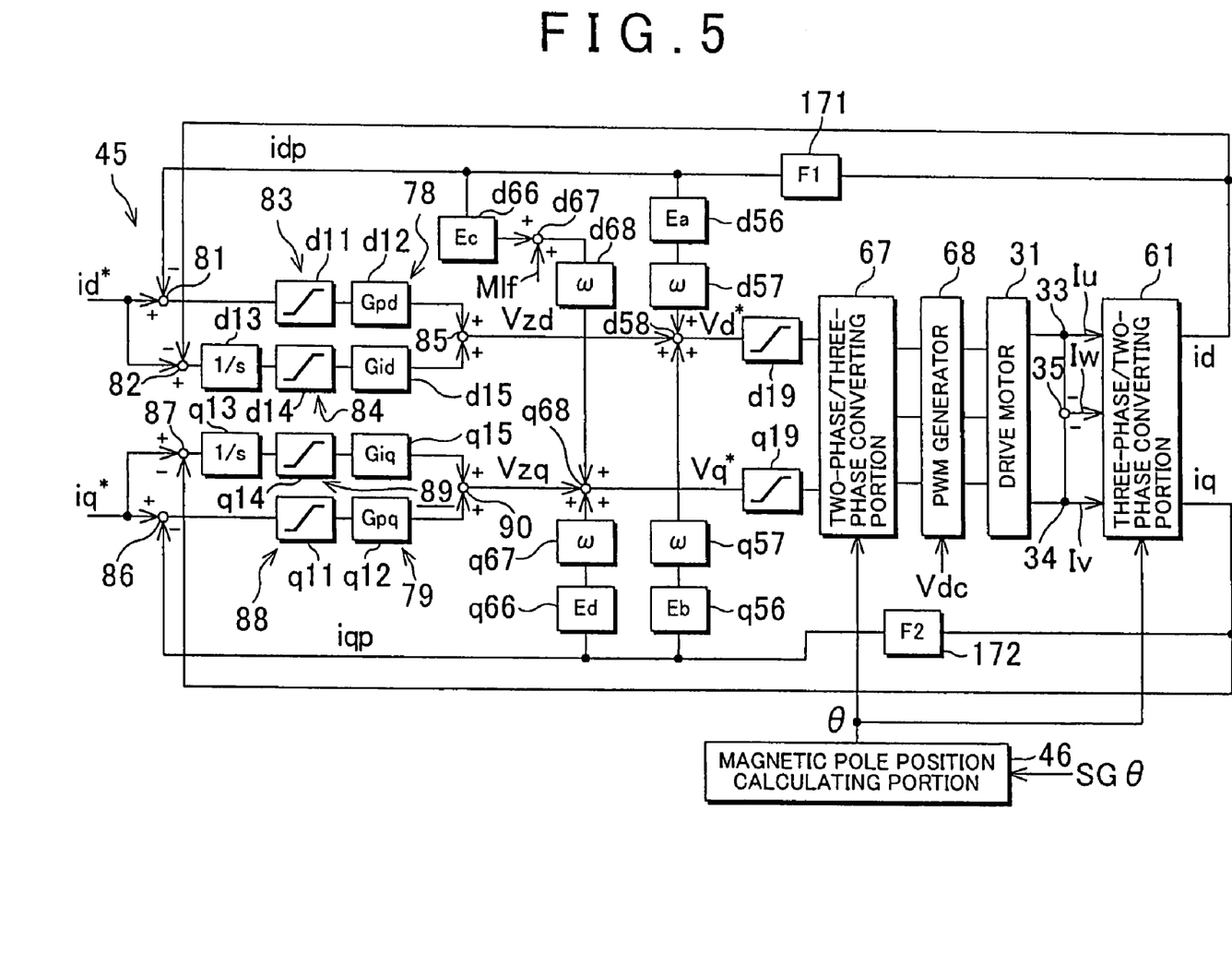
FIG. 5 is a block diagram of an electric drive control device according to a second exemplary embodiment.

FIG. 5 is a block diagram of an electric drive control device according to the second exemplary embodiment. To simplify the description, the inverter 40 (FIG. 2) and the drive circuit 51 are omitted from FIG. 5.

In this case, feedback control is performed according to a vector control calculation on the d-q axis so the permanent magnet 20 (FIG. 3) is placed in a reference position and the salient pole 57 is offset.

The current command value calculating device performs a current command value calculation process in which it calculates the d-axis current command value id* and the q-axis current command value iq* indicative of target values of the d-axis current id and the q-axis current iq, respectively, on the d-q axis. Therefore, a vehicle speed detecting device performs a vehicle speed detection process in which it detects a vehicle speed V corresponding to the drive motor speed NM, and sends the detected vehicle speed V to the vehicle control device. A vehicular command value calculating device of the vehicle control device performs a vehicular command value calculation process in which it reads the vehicle speed V and the accelerator opening amount α, calculates a vehicle required torque TO* based on the vehicle speed V and the accelerator opening amount α, generates a drive motor target torque TM* indicative of a target value of the drive motor torque TM, i.e., the torque generated by the drive motor 31, corresponding to the vehicle required torque TO*, and sends it to the drive motor control device 45. The drive motor target torque TM* is the electric machine target torque.

The current command value calculating device reads the direct current voltage Vdc, the angular speed o), and the drive motor target torque TM* and calculates a d-axis current command value id* and a q-axis current command value iq* on the d-q line that corresponds to the drive motor target torque TM* by referring to the current command value map.

The d-axis current command value id* and the q-axis current command value iq* constitute a current command value.

Next, the detected current obtaining device performs a detected current obtaining process in which it reads and obtains the detected currents iu and iv while a calculator 35 of the detected current obtaining device obtains, through calculation, the detected current iw $$iw = -iu - iv$$

based on the detected currents iu and iv.

Continuing on, a three-phase/two-phase converting portion 61, which is a first phase converting device, performs a three-phase/two-phase conversion as a first conversion process, in which it reads the magnetic pole position θ and converts each of the detected currents iu, iv, and iw into d-axis currents id and q-axis currents iq on the d-q axis in Expression 10 below.

[Expression 10]

$$\begin{pmatrix} id \\ iq \end{pmatrix} = \sqrt{\frac{2}{3}} \begin{pmatrix} \cos(\omega t) & \cos\left(\omega t - \frac{2}{3}\pi\right) & \cos\left(\omega t + \frac{2}{3}\pi\right) \\ -\sin(\omega t) & -\sin\left(\omega t - \frac{2}{3}\pi\right) & -\sin\left(\omega t + \frac{2}{3}\pi\right) \end{pmatrix} \cdot \begin{pmatrix} iu \\ iv \\ iw \end{pmatrix} \quad (10)$$

In this way, when the d-axis current id and the q-axis current iq are calculated as actual currents and the d-axis current command value id* and the q-axis current command value iq* are calculated, feedback control is performed based on the d-axis current id and the q-axis current iq, along with the d-axis current command value id* and the q-axis current command value iq*.

The d-axis voltage vd and the q-axis voltage vq can be expressed in Expression 11 below.

[Expression 11]

$$\begin{pmatrix} vd \\ vq \end{pmatrix} = \begin{pmatrix} Ra & 0 \\ 0 & Ra \end{pmatrix} \cdot \begin{pmatrix} id \\ iq \end{pmatrix} + \quad (11)$$

$$\frac{d}{dt}\begin{pmatrix} \cos\delta & \sin\delta \\ -\sin\delta & \cos\delta \end{pmatrix}^{-1} \cdot \begin{pmatrix} Ld & 0 \\ 0 & Lq \end{pmatrix} \cdot \begin{pmatrix} \cos\delta & \sin\delta \\ -\sin\delta & \cos\delta \end{pmatrix} \cdot \begin{pmatrix} id \\ iq \end{pmatrix} +$$

$$\begin{pmatrix} \cos\delta & \sin\delta \\ -\sin\delta & \cos\delta \end{pmatrix}^{-1} \cdot \begin{pmatrix} 0 & -\omega \cdot Lq \\ \omega \cdot Ld & 0 \end{pmatrix} \cdot \begin{pmatrix} \cos\delta & \sin\delta \\ -\sin\delta & \cos\delta \end{pmatrix} \cdot \begin{pmatrix} id \\ iq \end{pmatrix} +$$

$$\begin{pmatrix} 0 \\ \omega \cdot MIf \end{pmatrix}$$

The d-axis voltage command value vd* indicative of a target value of the d-axis voltage vd, and the q-axis voltage command value vq* indicative of a target value of the q-axis voltage vq can be expressed by Expression 12 below.

[Expression 12]

$$\begin{pmatrix} vd^* \\ vq^* \end{pmatrix} = \begin{pmatrix} Ra & 0 \\ 0 & Ra \end{pmatrix} \cdot \begin{pmatrix} id^* \\ iq^* \end{pmatrix} + \quad (12)$$

$$\frac{d}{dt}\begin{pmatrix} \cos\delta & \sin\delta \\ -\sin\delta & \cos\delta \end{pmatrix}^{-1} \cdot \begin{pmatrix} Ld & 0 \\ 0 & Lq \end{pmatrix} \cdot \begin{pmatrix} \cos\delta & \sin\delta \\ -\sin\delta & \cos\delta \end{pmatrix} \cdot \begin{pmatrix} id^* \\ iq^* \end{pmatrix} +$$

$$\begin{pmatrix} \cos\delta & \sin\delta \\ -\sin\delta & \cos\delta \end{pmatrix}^{-1} \cdot \begin{pmatrix} 0 & -\omega \cdot Lq \\ \omega \cdot Ld & 0 \end{pmatrix} \cdot \begin{pmatrix} \cos\delta & \sin\delta \\ -\sin\delta & \cos\delta \end{pmatrix} \cdot \begin{pmatrix} id^* \\ iq^* \end{pmatrix} +$$

$$\begin{pmatrix} 0 \\ \omega \cdot MIf \end{pmatrix}$$

When feedback control is performed based on Expression 12, the first term on the right-hand side in Expression 11 represents integral components Vzdi and Vzqi of voltage drop components Vzd and Vzq generated in the resistance Ra of the stator coils 11 to 13, and the second term represents proportional components Vzdp and Vzqp of the voltage drop components Vzd and Vzq, such that the voltage drop components Vzd and Vzq are as follows.

$$Vzd = Vzdi + Vzdp$$

$$Vzq = Vzqi + Vzqp$$

Also, the sum of the third and fourth terms in Expression 11 represent induced voltage components ed and eq $$ed = \omega \times (Ea + Eb)$$

$$eq = \omega \times (Ec + MIf + Ed)$$

generated by the q-axis current iq and the d-axis current id. Values Ea to Ed are as follows.

$$Ea = -\omega \times Ld \times \sin \delta \times \cos \delta + \omega \times Lq \times \sin \delta \times \cos \delta$$

$$Eb = -\omega \times Ld \times \sin 2\delta - \omega \times Lq \times \cos 2\delta$$

$$Ec = \omega \times Ld \times \cos 2\delta + \omega \times Lq \times \sin 2\delta$$

$$Ed = \omega \times Ld \times \sin \delta \times \cos \delta - \omega \times Lq \times \sin \delta \times \cos \delta$$

In this case, the value $\omega \times MIf$ denotes a value that compensates for the back electromotive voltage generated by the d-axis current id flowing through the stator coils 11 to 13.

In this exemplary embodiment as well, the sampling cycle is substantially shortened by estimating the d-axis current id and the q-axis current iq after the extremely short period of time $\Delta t$ has passed based on the detected currents iu, iv, and iw.

Therefore, if in Expression 11

[Expression 13]

$$X = \begin{pmatrix} \cos\delta & \sin\delta \\ -\sin\delta & \cos\delta \end{pmatrix}^{-1} \cdot \begin{pmatrix} Ld & 0 \\ 0 & Lq \end{pmatrix} \cdot \begin{pmatrix} \cos\delta & \sin\delta \\ -\sin\delta & \cos\delta \end{pmatrix} \text{ and} \quad (13)$$

[Expression 14]

$$\begin{pmatrix} Vzd \\ Vzq \end{pmatrix} = \begin{pmatrix} vd \\ vq \end{pmatrix} - \begin{pmatrix} \cos\delta & \sin\delta \\ -\sin\delta & \cos\delta \end{pmatrix}^{-1} \cdot \begin{pmatrix} 0 & -\omega \cdot Lq \\ \omega \cdot Ld & 0 \end{pmatrix} \cdot \begin{pmatrix} \cos\delta & \sin\delta \\ -\sin\delta & \cos\delta \end{pmatrix} \cdot \begin{pmatrix} id^* \\ iq^* \end{pmatrix} - \begin{pmatrix} 0 \\ \omega \cdot MIf \end{pmatrix} \quad (14)$$

then

[Expression 15]

$$\begin{pmatrix} Vzd \\ Vzq \end{pmatrix} - \begin{pmatrix} Ra & 0 \\ 0 & Ra \end{pmatrix} \cdot \begin{pmatrix} id \\ iq \end{pmatrix} = X \cdot \frac{d}{dt} \begin{pmatrix} id \\ iq \end{pmatrix} \quad (15)$$

Here, X is the product of the axis conversion matrix, the matrix made up of the d-axis inductance Ld and the q-axis inductance Lq, and the inverse matrix of the axis conversion matrix, and is the inductance of the stator coils 11 to 13 that is set based on the angle $\delta$.

Therefore, when the d-axis current after the extremely short period of time $\Delta t$ has passed is made idp $$idp = id + \Delta id$$

and the q-axis current after the extremely short period of time $\Delta t$ has passed is made iqp $$iqp = iq + \Delta iq$$

the d-axis current idp and the q-axis current iqp are as shown in Expression 16 below.

[Expression 16]

$$\begin{pmatrix} idp \\ iqp \end{pmatrix} = X^{-1} \cdot \left( \begin{pmatrix} Vzd \\ Vzq \end{pmatrix} - \begin{pmatrix} Ra & 0 \\ 0 & Ra \end{pmatrix} \cdot \begin{pmatrix} id \\ iq \end{pmatrix} \right) \cdot \Delta t + \begin{pmatrix} id \\ iq \end{pmatrix} \quad (16)$$

Here, $X^{-1}$ is an inverse number from the inverse matrix of the inductance X.

In this exemplary embodiment, the detected currents iu, iv, and iw are estimated as the d-axis current id and the q-axis current iq after the sampling, and the d-axis current id and q-axis current iq after just one sampling timing are estimated as the d-current idp and the q-axis current iqp.

Also, when estimating the d-axis current idp and the q-axis current iqp, if the currents Iu, Iv, and Iw supplied to the stator coils 11 to 13 change such that the d-axis inductance Ld and the q-axis inductance Lq of the stator coils 11 to 13 change, for example, it may cause an estimated current error to occur in the d-axis current idp and the q-axis current iqp. In this case, when a difference between the d-axis current idp and the d-axis current command value id* is made d-axis current deviation $\epsilon$idp and a difference between the q-axis current iqp and the q-axis current command value iq* is made q-axis current deviation $\epsilon$iqp and feedback control is performed, it is difficult to bring the d-axis-current deviation $\epsilon$idp and the q-axis current deviation $\epsilon$iqp close to zero so a continuous deviation occurs between the d-axis current idp and the q-axis current iqp and the d-axis current command value id* and the q-axis current command value iq*.

Thus, in this exemplary embodiment, proportional control is performed based on the estimated d-axis current idp and q-axis current iqp, and integral control is performed based on the current d-axis current id and q-axis current iq.

Therefore, on one hand, the d-axis current id that was converted in the three-phase/two-phase converting portion 61 is sent to a current estimating portion (F1) 171 which is the current estimating device. The current estimating portion 171 then performs a current estimation process in which it estimates, through calculation, the d-axis current idp. The d-axis current idp is then sent as an estimated current to a subtracter 81 which is the estimated deviation calculating device. On the other hand, the aforementioned d-axis current id is also sent, as it is as an actual current, to a subtracter 82 which is the actual deviation calculating device.

In the current estimating portion 171, when the sampling cycle is T, the estimated d-axis current idp is $$idp = id + T \times X^{-1} \times (Vzd - Ra \times id)$$

by substituting the sampling cycle T for the extremely short period of time $\Delta t$ in Expression 16.

The subtracter 81 performs an estimated deviation calculation process in which it calculates the d-axis current deviation $\epsilon$idp as an estimated deviation between the d-axis current idp and the d-axis current command value id*. The subtracter 82 performs an actual deviation calculation process in which it calculates the d-axis current deviation $\epsilon$id as the actual deviation between the d-axis current id and the d-axis current command value id*, and sends the d-axis current deviations $\epsilon$idp and $\epsilon$id to a voltage command value calculating portion 78 which is both a proportional/integral calculating device and a voltage command value calculating device.

Similarly, on one hand, the q-axis current iq is sent to a current estimating portion (F2) 172 which is the current estimating device. The current estimating portion 172 then performs a current estimation process in which it estimates, through calculation, the q-axis current iqp. The q-axis current iqp is then sent as an estimated current to a subtracter 86 which is the estimated deviation calculating device. On the other hand, the aforementioned q-axis current iq is also sent, as it is as an actual current, to a subtracter 87 which is the actual deviation calculating device.

In the current estimating portion 172, the estimated d-axis current iqp is $$iqp = iq + T \times X{-}1 \times (Vzq \times Ra \times iq)$$

by substituting the sampling cycle T for the extremely short period of time Δt in Expression 16.

The subtracter 86 performs an estimated deviation calculation process in which it calculates a q-axis current deviation ∈iqp as an estimated deviation between the q-axis current iqp and the q-axis current command value iq*. The subtracter 87 performs an actual deviation calculation process in which it calculates the q-axis current deviation ∈iq as the actual deviation between the q-axis current iq and the q-axis current command value iq*, and sends the q-axis current deviations ∈iqp and ∈iq to a voltage command value calculating portion 79 which is both a proportional/integral calculating device and the voltage command value calculating device.

Continuing on, the voltage command value calculating portions 78, 79 perform a voltage command value calculation process and a proportional/integral (PI) calculation process. Here, the voltage command value calculating portion 78 calculates the d-axis voltage command value vd* in Expression 12 such that the d-axis current deviations ∈idp and ∈id become zero and the voltage command value calculating portion 79 calculates the q-axis voltage command value vq* in Expression 12 so that the q-axis current deviations ∈iqp and ∈iq become zero. The d-axis voltage command value vd* and q-axis voltage command value vq* constitute a voltage command value. Also, the voltage command value calculating portions 78, 79 constitute a current controlling device.

Therefore, the voltage command value calculating portion 78 includes a proportional calculating portion 83 which is a proportional calculating device, an integral calculating portion 84 which is an integral calculating device, and an adder 85 which is a voltage drop component calculating device. The proportional calculating portion 83 performs a proportional calculation process using a limiter d11 and a gain multiplier (Gpd) d12, in which it calculates a proportional component Vzdp $$Vzdp = Gpd \times \epsilon idp$$

as a proportional calculation value based on the d-axis current deviation ∈idp and a gain Gpd for the proportional calculation. The integral calculating portion 84 performs an integral calculation process using an integrator (1/s) d13, a limiter d14, and a gain multiplier (Gid) d15, in which it calculates an integral component Vzdi $$Vzdi = Gid \times \Sigma \epsilon id$$

as an integral calculation value based on the d-axis current deviation ∈id and a gain Gid for the integral calculation. The adder 85 performs a voltage drop component calculation process in which it adds the integral component Vzdi and the proportional component Vzdp to calculate the voltage drop component Vzd $$\begin{aligned} Vzd &= Vzdi + Vzdp \\ &= Gid \times \Sigma \epsilon id + Gpd \times \epsilon idp \end{aligned}$$

The limiter d11 limits the d-axis current deviation ∈idp so that it will not diverge and the limiter d14 limits the integral value Σ∈id so that it will not diverge.

Also, the voltage command value calculating portion 78 is provided with an induced voltage component calculating device. The induced voltage component calculating device includes a multiplier (Ea) d56, a multiplier (ω) d57, a multiplier (Eb) q56, a multiplier (ω) q57, and an adder d58 which is a command value calculating device, and performs an induced voltage component calculation process in which it reads the angular speed ω, the angle δ, the d-axis current idp, and the q-axis current iqp, and calculates an induced voltage component ed.

$$ed = \omega \times (Ea + Eb)$$

$$Ea = -\omega \times Ld \times \sin\delta \times \cos\delta + \omega \times Lq \times \sin\delta \times \cos\delta$$

$$Eb = -\omega \times Ld \times \sin 2\delta - \omega \times Lq \times \cos 2\delta$$

In this case, the value ω×(Ea+Eb) is a value that isolates the d-axis current idp and the q-axis current iqp.

Continuing on, the adder d58 performs a command value calculation process in which it calculates the d-axis voltage command value vd*

$$\begin{aligned} vd^* &= Vzd + ed \\ &= Vzd + \omega \times (Ea + Eb) \end{aligned}$$

as an output voltage by adding the induced voltage component ed to the voltage drop component Vzd sent from the adder 85. In this way, the d-axis voltage command value vd* is generated so that the d-axis current deviations ∈idp and ∈id become zero. The d-axis voltage command value vd* is then sent via a limiter d19 to a two-phase/three-phase converting portion 67 which is the second phase converting device. The limiter d19 limits the d-axis voltage command value vd* so that it will not diverge.

Meanwhile, the voltage command value calculating portion 79 includes a proportional calculating portion 88 which is a proportional calculating device, an integral calculating portion 89 which is an integral calculating device, and an adder 90 which is a voltage drop component calculating device. The proportional calculating portion 88 performs a proportional calculation process using a limiter q11 and a gain multiplier (Gpq) q12, in which it calculates a proportional component Vzqp $$Vzqp = Gpq \times \epsilon iqp$$

as a proportional calculation value based on the q-axis current deviation ∈iqp and a gain Gpq for the proportional calculation. The integral calculating portion 89 performs an integral calculation process using an integrator (1/s) q13, a limiter q14, and a gain multiplier (Giq) q15, in which it calculates an integral component Vzqi $$Vzqi = Giq \times \Sigma \epsilon iq$$

as an integral calculation value based on the q-axis current deviation ∈iq and a gain Giq for the integral calculation. The adder 90 performs a voltage drop component calculation process in which it adds the integral component Vzqi and the proportional component Vzqp to calculate the voltage drop component Vzq $$\begin{aligned} Vzq &= Vzqi + Vzqp \\ &= Giq \times \Sigma \epsilon iq + Gpq \times \epsilon iqp \end{aligned}$$

The limiter q11 limits the q-axis current deviation ∈iqp so that it will not diverge and the limiter q14 limits the integral value Σ∈iq so that it will not diverge.

Also, the voltage command value calculating portion 79 is provided with an induced voltage component calculating device. The induced voltage component calculating device includes a multiplier (Ec) d66, an adder d67, a multiplier (ω) d68, a multiplier (Ed) q66, a multiplier (ω) q67, and an adder q68 which is a command value calculating device. The voltage command value calculating portion 79 performs an induced voltage component calculation process in which it reads the angular speed ω, the angle δ, the back electromotive voltage constant MIf, the d-axis current idp, and the q-axis current iqp, and calculates an induced voltage component eq.

$$eq = \omega \times (Ec + MIf + Ed)$$

$$Ec = \omega \times Ld \times \cos 2\delta + \omega \times Lq \times \sin 2\delta$$

$$Ed = \omega \times Ld \times \sin \delta \times \cos \delta - \omega \times Lq \times \sin \delta \times \cos \delta$$

In this case, the value ω×(Ec+Ed) is a value that isolates the d-axis current idp and the q-axis current iqp, and the value ω×MIf is a value that compensates for the back electromotive voltage generated by the d-axis current idp flowing through the stator coils 11 to 13.

Continuing on, the adder q68 performs a command value calculation process in which it calculates the q-axis voltage command value vq*

$$vq^* = Vzq + eq$$
$$= Vzq + \omega \times (Ec + MIf + Ed)$$

as an output voltage by adding the induced voltage component eq to the voltage drop component Vzq sent from the adder 90. In this way, the q-axis voltage command value vq* is generated so that the q-axis current deviations εiqp and εiq become zero. The q-axis voltage command value vq* is then sent via a limiter q19 to the two-phase/three-phase converting portion 67. The limiter q19 limits the q-axis voltage command value vq* so that it will not diverge.

Continuing on, the two-phase/three-phase converting portion 67 reads the d-axis voltage command value vd*, the q-axis voltage command value vq*, and the magnetic pole position θ, and performs two-phase/three-phase conversion as a second conversion process, in which it converts the d-axis voltage command value vd* and the q-axis voltage command value vq* to voltage command values vu*, vv*, and vw* for the U phase, V phase, and W phase, respectively, in Expression 17 below. The two-phase/three-phase converting portion 67 then sends the voltage command values vu*, vv*, and vw* to a PWM generator 68 which is an output signal calculating device.

[Expression 17]

$$\begin{pmatrix} vu^* \\ vv^* \\ vw^* \end{pmatrix} = \sqrt{\frac{2}{3}} \begin{pmatrix} \cos(\omega t) & -\sin(\omega t) \\ \cos\left(\omega t - \frac{2}{3}\pi\right) & -\sin\left(\omega t + \frac{2}{3}\pi\right) \\ \cos\left(\omega t - \frac{2}{3}\pi\right) & -\sin\left(\omega t + \frac{2}{3}\pi\right) \end{pmatrix} \cdot \begin{pmatrix} vd^* \\ vq^* \end{pmatrix} \quad (17)$$

The PWM generator 68 performs an output signal calculation process in which it generates, as output signals, pulse width modulation signals Mu, Mv, and Mw for each phase which have pulse widths corresponding to the d-axis current command value id* and the q-axis current command value iq*, based on both the voltage command values vu*, vv*, and vw* of each phase and the direct current voltage Vdc. The PWM generator 68 then sends the generated pulse width modulation signals Mu, Mv, and Mw to a drive circuit 51 which is provided outside the drive motor control device 45.

The drive circuit 51 receives the pulse width modulation signals Mu, Mv, and Mw of each phase and generates six gate signals which it sends to the inverter 40. Based on the pulse width modulation signals Mu, Mv, and Mw, the inverter 40 switches the transistors Tr1 to Tr6 to generate currents Iu, Iv, and Iw for each phase, which it then supplies to the stator coils 11 to 13.

In this way, torque control is performed based on the drive motor target torque TM* and the drive motor 31 is driven to run the electric vehicle.

In this exemplary embodiment, an asymmetrical salient pole motor is used for the drive motor 31. The d-axis current command value id* and the q-axis current command value iq* are calculated, and the d-axis voltage command value vd* and the q-axis voltage command value vq* are calculated, based on a voltage equation in which the permanent magnet 20 is placed in a reference position and the salient pole 57 is placed in a position offset by an angle δ when the center of the magnetic flux density distribution generated at the salient pole 57 is offset by an angle δ with respect to the center of the opening angle of the salient pole 57. As a result, the electrical characteristics are the same as when a symmetrical salient pole motor is used for the drive motor 31.

Accordingly, when estimating the d-axis current idp and the q-axis current iqp based on the voltage equation, isolating the d-axis current idp and the q-axis current iqp, and compensating for the back electromotive voltage, neither undershooting nor overshooting will occur in the feedback control, which makes it possible to prevent a decline in the transitional characteristics of the feedback control.

Although exemplary embodiments have been described herein, the disclosure is not limited to those specific exemplary embodiments. To the contrary, many modifications and variations are possible without departing from the spirit or essential characteristics of the disclosed invention. Accordingly, all such modifications and variations are included within the intended scope of the invention.

What is claimed is:

1. An electric drive device, comprising:
   an electric machine having an asymmetrical salient pole between permanent magnets;
   a current detecting portion that detects a current supplied to the electric machine;
   a phase converting device that converts the current detected by the current detecting portion into an axis current; and
   a current controlling device which generates, based on the axis current and a current command value of the axis current, a voltage command value for driving the electric machine, wherein the current controlling device generates the voltage command value in response to the detected current and an offset angle of the center of a magnetic flux density distribution occurring at the salient pole, with respect to the center of an opening angle of the salient pole.

2. The electric drive device according to claim 1, further comprising a current estimating device which estimates, based on the detected current, a detected current after a predetermined period of time has passed, wherein the current controlling device generates the voltage command value based on the estimated detected current.

3. The electric drive device according to claim 1, wherein the axis current and the current command value are generated on a converted axis that is offset by the offset angle, and the current controlling device generates the voltage command value according to a voltage equation in which the salient pole is placed at a reference position and a permanent magnet is placed in a position offset by the offset angle.

4. The electric drive device according to claim 3, wherein the current controlling device includes a voltage drop component calculating device which calculates a voltage drop component based on a current deviation between the axis current and the current command value, and an induced voltage component calculating device which calculates an induced voltage component, and the induced voltage component calculating device compensates for a back electromotive voltage for each axis current when calculating the induced voltage component.

5. The electric drive device according to claim 4, wherein the current estimating device estimates a detected current based on the voltage drop component, the product of the axis current and a resistance value on the converted axis, and the inverse number of an inductance.

6. The electric drive device according to claim 2, wherein the axis current and the current command value are generated on a converted axis that is offset by the offset angle, and the current controlling device generates the voltage command value according to a voltage equation in which the salient pole is placed at a reference position and a permanent magnet is placed in a position offset by the offset angle.

7. The electric drive device according to claim 6, wherein the current controlling device includes a voltage drop component calculating device which calculates a voltage drop component based on a current deviation between the axis current and the current command value, and an induced voltage component calculating device which calculates an induced voltage component, and the induced voltage component calculating device compensates for a back electromotive voltage for each axis current when calculating the induced voltage component.

8. The electric drive device according to claim 7, wherein the current estimating device estimates a detected current based on the voltage drop component, the product of the axis current and a resistance value on the converted axis, and the inverse number of an inductance.

9. The electric drive device according to claim 1, wherein the axis current and the current command value are generated on an axis established by the center of an opening angle of a permanent magnet and the center of the opening angle of the salient pole, and the current controlling device generates the voltage command value according to a voltage equation in which the permanent magnet is placed at a reference position and the salient pole is placed at a position offset by the offset angle.

10. The electric drive device according to claim 9, wherein the current controlling device includes a voltage drop component calculating device which calculates a voltage drop component based on a current deviation between the axis current and the current command value, and an induced voltage component calculating device which calculates an induced voltage component, and the induced voltage component calculating device isolates both axis currents for each axis current when calculating the induced voltage component.

11. The electric drive device according to claim 10, wherein the current estimating device estimates a detected current based on the voltage drop component, the product of the axis current and a resistance value, and the inverse number of an inductance represented by the offset angle.

12. The electric drive device according to claim 2, wherein the axis current and the current command value are generated on an axis established by the center of an opening angle of a permanent magnet and the center of the opening angle of the salient pole, and the current controlling device generates the voltage command value according to a voltage equation in which the permanent magnet is placed at a reference position and the salient pole is placed at a position offset by the offset angle.

13. The electric drive device according to claim 12, wherein the current controlling device includes a voltage drop component calculating device which calculates a voltage drop component based on a current deviation between the axis current and the current command value, and an induced voltage component calculating device which calculates an induced voltage component, and the induced voltage component calculating device isolates both axis currents for each axis current when calculating the induced voltage component.

14. The electric drive device according to claim 13, wherein the current estimating device estimates a detected current based on the voltage drop component, the product of the axis current and a resistance value, and the inverse number of an inductance represented by the offset angle.

15. An electric drive device, comprising:
an electric machine having an asymmetrical salient pole between permanent magnets;
a current detecting portion that detects a current supplied to the electric machine;
a phase converting device that converts the current detected by the current detecting portion into an axis current; and
a current controlling device which generates, based on the axis current and a current command value of the axis current, a voltage command value for driving the electric machine, wherein the current controlling device adopts a d axis in a direction of a pair of magnetic poles of a rotor and adopts a q axis in a direction perpendicular to the d axis based on the detected current and a magnetic pole position of the rotor of the electric machine, and generates the voltage command value in accordance with an offset angle from the q axis to a current phase at which reluctance torque starts to be generated.

16. An electric drive control method, comprising:
detecting a current supplied to an electric machine having an asymmetrical salient pole between permanent magnets;
converting the detected current into an axis current; and
generating, based on the axis current and a current command value of the axis current, a voltage command value for driving the electric machine, wherein the voltage command value is generated in response to the detected current and an offset angle of the center of a magnetic flux density distribution occurring at the salient pole, with respect to the center of an opening angle of the salient pole.

17. A program for an electric drive control method, comprising instructions, which when executed by a computer perform:
operating the computer as a phase converting device that converts a current detected by a current detecting portion into an axis current; and
operating the computer as a current controlling device which generates, based on the axis current and a current command value of the axis current, a voltage command value for driving an electric machine having an asymmetrical salient pole between permanent magnets,
wherein the current controlling device generates the voltage command value in response to the detected current and an offset angle of the center of a magnetic flux density distribution occurring at the salient pole, with respect to the center of an opening angle of the salient pole.

* * * * *